United States Patent

Snell et al.

Patent Number: 5,468,132
Date of Patent: Nov. 21, 1995

[54] WATER TURBINES

[75] Inventors: Michael James Snell, Gloucester; Leonard Stanley Snell, Bristol, both of England

[73] Assignee: Snell (Hydro Design) Consultancy Limited, Stroud, England

[21] Appl. No.: 244,493

[22] PCT Filed: Nov. 2, 1992

[86] PCT No.: PCT/GB92/01999

§ 371 Date: May 24, 1994

§ 102(e) Date: May 24, 1994

[87] PCT Pub. No.: WO93/14314

PCT Pub. Date: Jul. 22, 1993

[30] Foreign Application Priority Data

Jan. 7, 1992 [GB] United Kingdom ............. 9200217

[51] Int. Cl.⁶ .................................................. F01C 1/24
[52] U.S. Cl. ................................................. 418/206
[58] Field of Search ..................... 418/206, 206.2, 418/206.4, 206.5

[56] References Cited

U.S. PATENT DOCUMENTS

| | | | |
|---|---|---|---|
| 61,592 | 1/1867 | Williams | 418/206 |
| 294,026 | 2/1884 | Fitts | 418/206 |
| 1,030,083 | 6/1912 | Green | 418/206 |
| 2,309,443 | 1/1943 | Cuthbert . | |
| 2,439,427 | 4/1948 | Guibert et al. . | |
| 3,287,909 | 11/1966 | Kell | 418/206 |
| 4,390,331 | 6/1983 | Nachtrieb . | |
| 4,753,585 | 6/1988 | Thompson | 418/206 |
| 4,913,629 | 4/1990 | Gilfillan . | |
| 4,938,670 | 7/1990 | Lee . | |

FOREIGN PATENT DOCUMENTS

| | | | |
|---|---|---|---|
| 219521 | 3/1958 | Australia | 418/206 |
| 0308827 | 3/1989 | European Pat. Off. . | |
| 470836 | 1/1929 | Germany . | |
| 884930 | 7/1953 | Germany . | |
| 2618075 | 1/1978 | Germany . | |
| 3407477 | 4/1985 | Germany . | |
| 3795 | of 1872 | United Kingdom | 418/206 |
| 135215 | 2/1920 | United Kingdom . | |

*Primary Examiner*—Richard A. Bertsch
*Assistant Examiner*—Charles G. Freay
*Attorney, Agent, or Firm*—Young & Thompson

[57] ABSTRACT

A water turbine (1) comprises a turbine chamber (3), an inlet port (4) and an outlet port (6) opening into the chamber (3), and two or more rotors (11, 12) arranged within the chamber (3) with their axes of rotation parallel so as to be rotatable in the water flow passing between the inlet port (4) and the outlet port (6). Each of the rotors (11, 12) has two or more substantially equi-angularly distributed lobes (17, 18), and the arrangement is such that the rotors (11, 12) rotate in opposite directions with their lobes in mesh with one another under the action of water impinging on the lobes of the rotors. Such a turbine can be constructed to operate efficiently with a low head of water, and is additionally of simple construction and therefore inexpensive to produce.

8 Claims, 3 Drawing Sheets

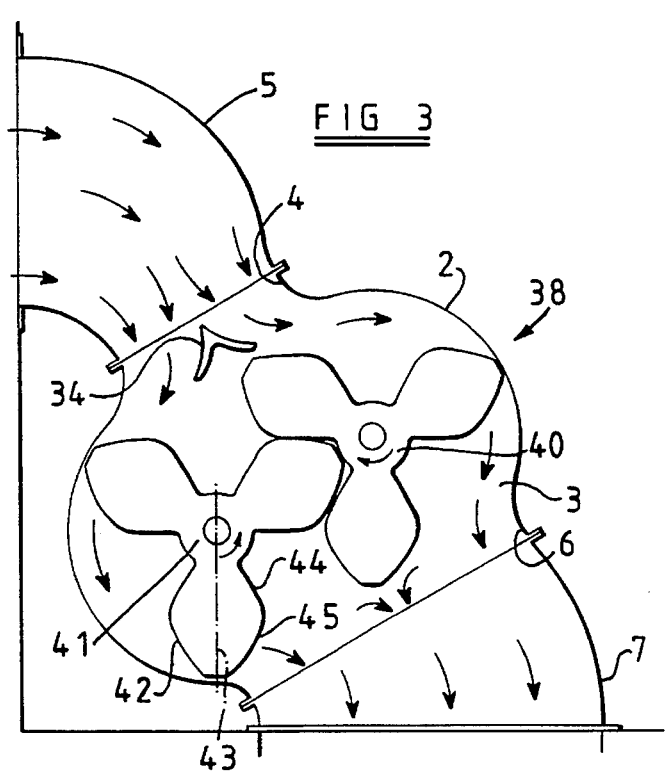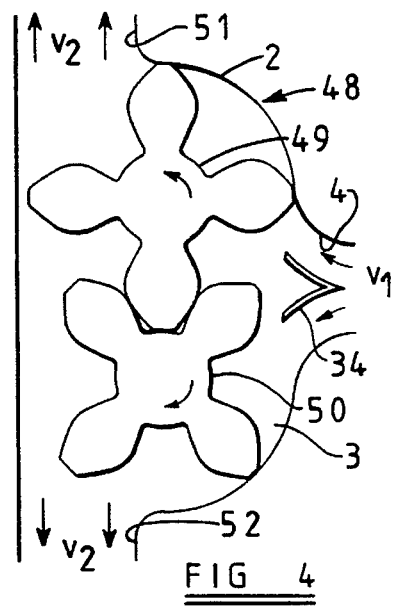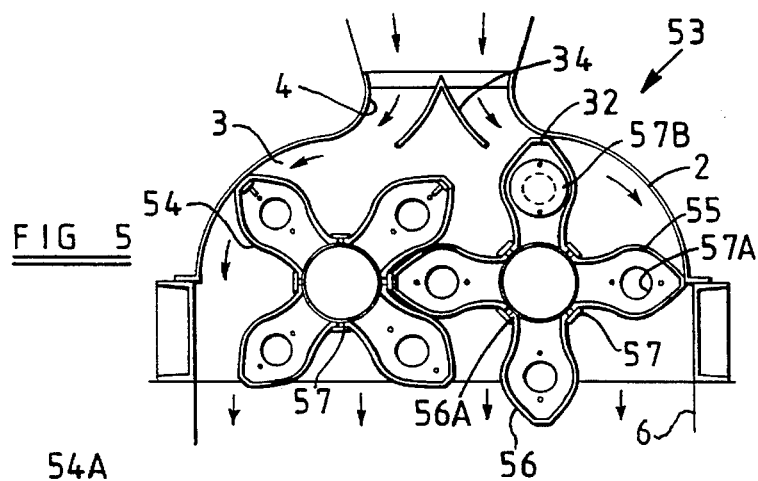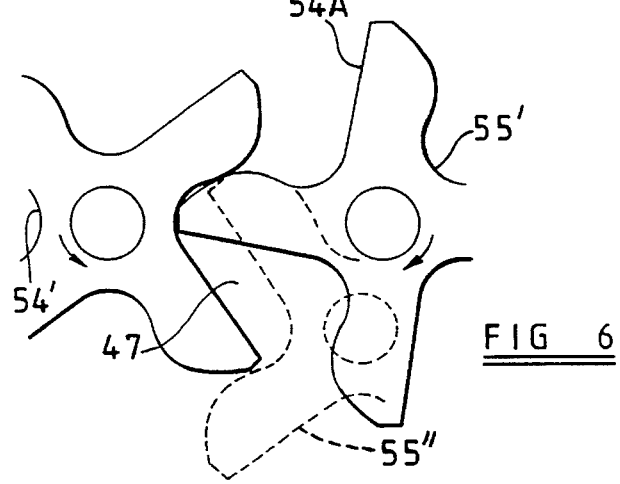

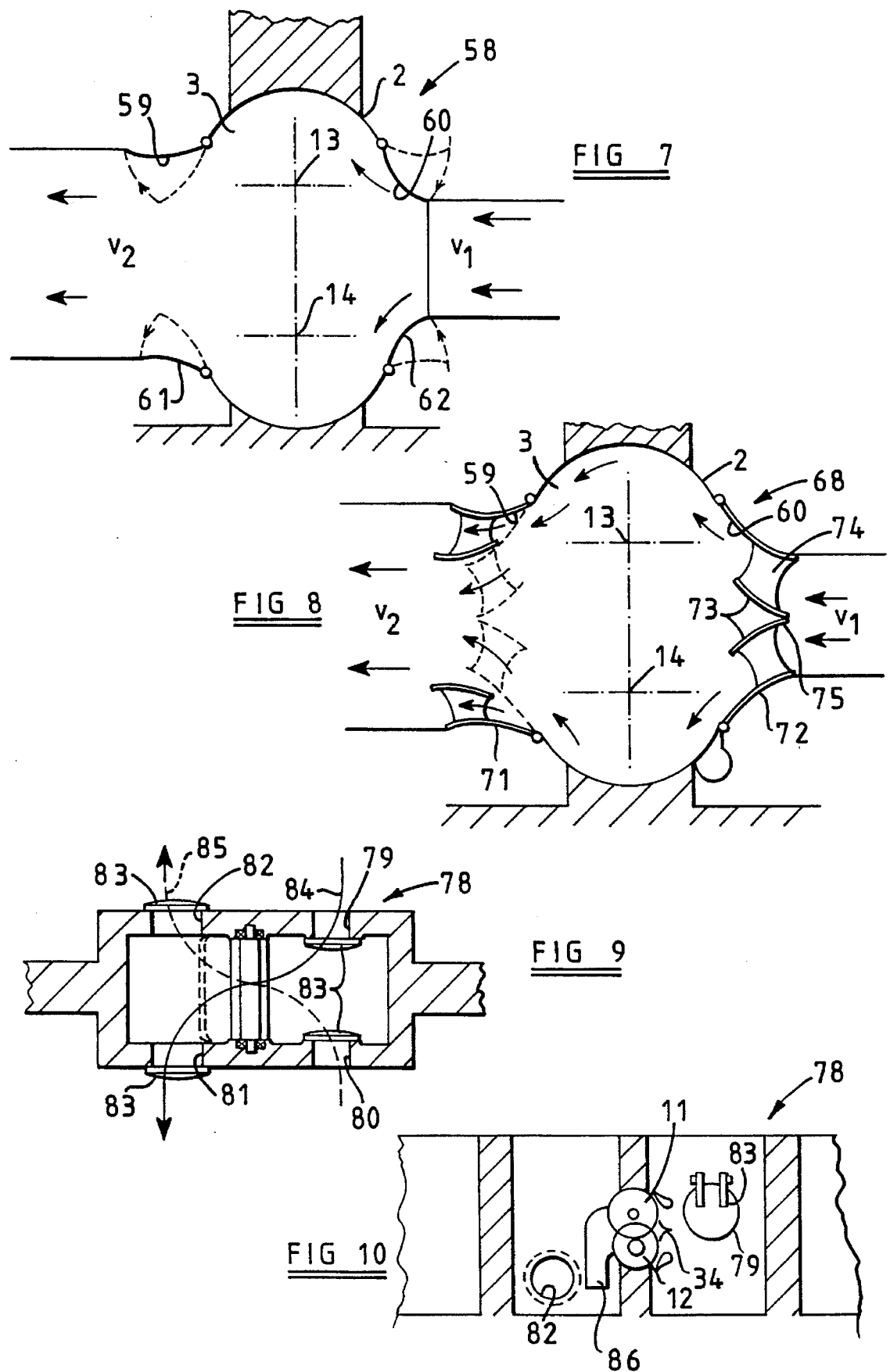

WATER TURBINES

FIELD OF THE INVENTION

This invention relates to water turbines and is more particularly, but not exclusively, concerned with water turbines which are capable of providing a reasonable power output under a low head of water.

BACKGROUND OF THE INVENTION

There are a number of applications in which it would be advantageous to be able to harness power, for hydroelectric power generation for example, from a flow of water having only a low head. A typical application is one in which power is to be generated by means of the water flow of a small river or stream where the head of water available is limited by the lie of the land and the necessity to limit civil engineering works on the basis of cost and/or environmental considerations. The use of conventional water turbines in such applications is for the most ruled out by the requirement for such turbines of high heads of water to obtain the necessary turbine speeds for economical generation of power. Other arrangements utilizing flapping gates, displaced floats and the like are ruled out because they are bulky and work with an intermittent action. Hydraulic rams are used extensively for raising water to provide a higher head, and a ram/turbine combination might be considered to provide a possible solution to this problem, although the size of ram required for the sort of flows envisaged in most applications would rule such an arrangement out in many circumstances.

It is an object of the invention to provide a new form of water turbine which is particularly suitable for use with a low head of water.

SUMMARY OF THE INVENTION

According to the present invention there is provided a water turbine comprising a turbine chamber, inlet and outlet ports opening into the chamber for the passage of inlet and outlet water flows, and rotors arranged within the chamber with their axes of rotation parallel so as to be rotatable by the inlet water flow, each of the rotors having two or more substantially equiangularly distributed lobes and the arrangement being such that adjacent rotors rotate in opposite directions with their lobes in mesh with one another, characterised in that the overall throughflow cross-section of the inlet port or ports is less than the overall throughflow cross-section of the outlet port or ports so as to ensure that the velocity of inlet water flow is high in relation to the velocity of outlet water flow.

Such a turbine is capable of operating efficiently with a low head of water, and is additionally of simple construction and therefore inexpensive to produce. It can be made to have only a small number of wearing parts and thus has a long service life. It is also capable of handling comparatively large volumes of water without becoming too bulky.

Advantageously the or each inlet port incorporates a flow splitter for accelerating the inlet water flow and directing the inlet water flow in the form of jets which impinge on the rotors in the required directions. Such a jetting action results in high turbine efficiency.

It is also advantageous for the rotors to define therebetween a space for taking up water trapped between the meshing lobes such that the volume of the space does not decrease during rotation of the rotors. To this end each lobe may be cut away at its trailing edge in order to provide the space for taking up trapped water. Preferably the rotors have cycloidal lobes, although in certain cases the lobes may have a form based on involute geometry. Furthermore each lobe of each rotor may comprise a radially inner part having an edge which extends along a radius of the rotor and a radially outer part having a convexly curved edge.

Furthermore the chamber preferably has curved internal wall portions which lie closely adjacent to portions of the circular areas swept out by rotation of the rotors so that the tips of the lobes of the rotor which is adjacent to each wall portion almost contact the wall portion in the course of rotation.

In most applications each rotor has a length appreciably greater than its diameter, and each of the inlet and outlet ports is in the form of a slot having its major dimension parallel to the axes of the rotors. However in certain applications it may be advantageous for the lobes to be located along a helix to achieve smooth torque transference in which case the inlet and outlet ports may be in the form of slots having their major dimensions substantially following the rotor lobe helix.

In certain circumstances, and particularly where each rotor has only two or three lobes, it may be necessary for the rotors to be coupled together by phasing gears. The rotors may also be coupled by means of gearing or a belt drive to an electrical generator or other driven means, or suitable drive means in the case of a pump.

In certain applications, for example for use in a tidal estuary, the direction of rotation of the rotors may be reversible in response to a change in the direction of water flow between the inlet and outlet ports. In this case the inlet and outlet ports may be provided with flaps for adjusting the size and/or shape of the ports in dependence on the direction of water flow.

Furthermore, in certain applications, it may be advantageous for a draught tube to be coupled to the outlet port.

BRIEF DESCRIPTION OF THE DRAWINGS

In order that the invention may be more fully understood, embodiments of water turbine in accordance with the invention will now be described, by way of example, with reference to the accompanying drawings, in which:

FIG. 3 is a diagrammatic cross-section through a second embodiment;

FIG. 4 is a diagrammatic cross-section through a third embodiment;

FIG. 5 is a diagrammatic cross-section through a fourth embodiment;

FIG. 6 is an explanatory diagram relating to a variant of the fourth embodiment;

FIG. 7 is a diagrammatic cross-section through a fifth embodiment;

FIG. 8 is a diagrammatic cross-section through a sixth embodiment; and

FIGS. 9 and 10 are respectively horizontal and vertical sections through a seventh embodiment.

DETAILED DESCRIPTION OF THE INVENTION

Figure 1:
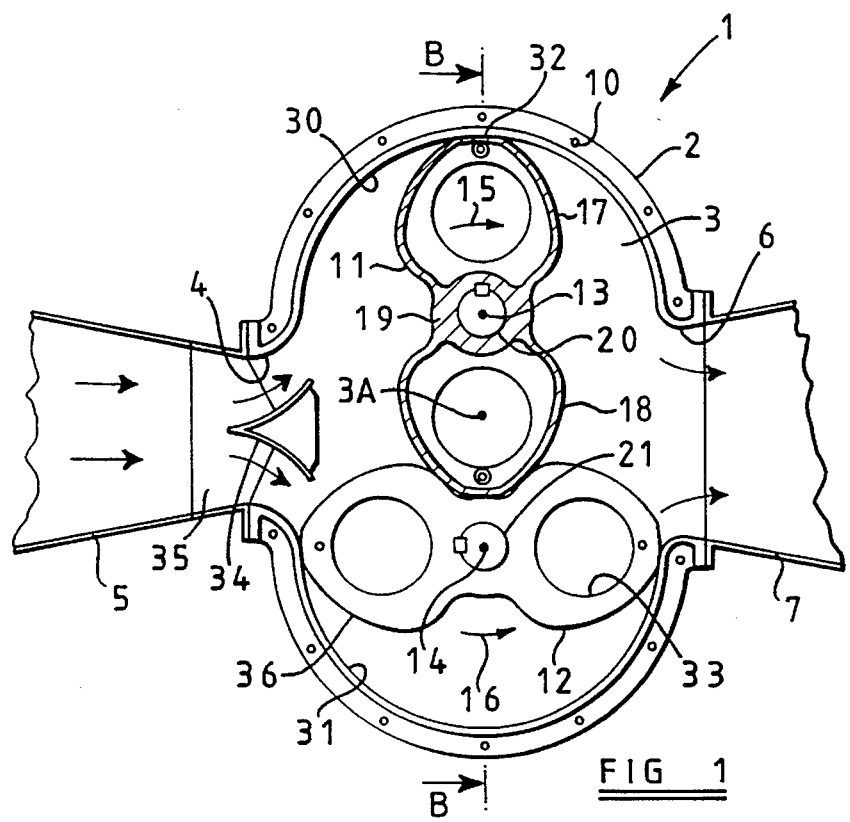
FIG. 1 is a cross-section through a first embodiment taken along the line A—A in FIG. 2.
Figure 2:
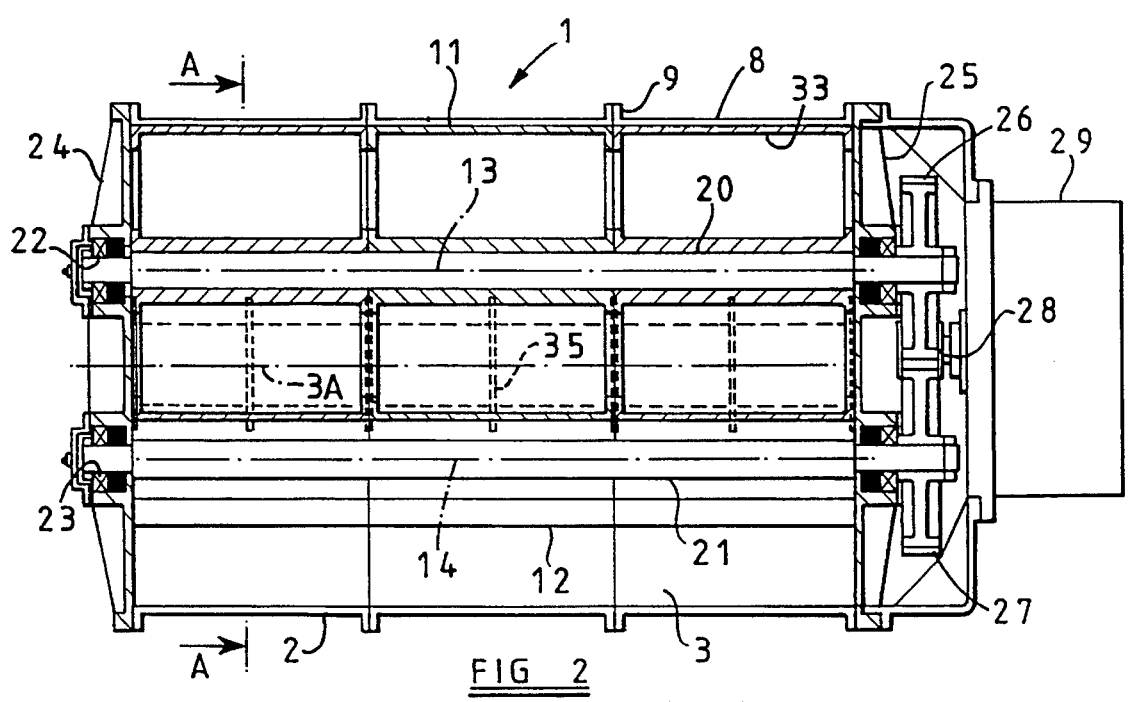
FIG. 2 is an axial section taken along the line B—B in FIG. 1.

FIGS. 1 and 2 show a water turbine 1 having a generally cylindrical outer casing 2 within which an elongate, generally cylindrical turbine chamber 3 having an axis 3A is defined. The chamber 3 has an inlet port 4 communicating with an inlet duct 5 and an outlet port 6 communicating with an outlet duct 7. As best seen in FIG. 2, the outer casing 2 is formed in a number of sections 8 having peripheral flanges 9 with apertures 10 therein for accommodating bolts (not shown) connecting adjacent casing sections 8 together.

Two rotors 11 and 12 are arranged within the chamber 3 with their axes of rotation 13 and 14 parallel to one-another and parallel to, and equidistant from, the axis 3A of the chamber 3 so as to be rotatable in opposite directions 15 and 16 in the water flow passing between the inlet port 4 and the outlet port 6.

Each rotor 11 or 12 has two equiangularly distributed lobes 17 and 18 extending radially from a hub 19 mounted on an associated drive shaft 20 or 21. As may be seen in FIG. 2, the drive shafts 20 and 21 are supported at their ends in bearings 22 and 23 mounted in end sections 24 and 25 of the outer casing 2. Furthermore the drive shafts 20 and 21 extend beyond the end section 25 and have phasing gears 26 and 27 mounted thereon. The phasing gears 26 and 27 mesh with one another so as to ensure correct phasing of the rotors 11 and 12 relative to one another, and more particularly so as to ensure that the rotors 11 and 12 rotate in opposite directions with their lobes intermeshing as shown in FIG. 1. Furthermore the phasing gears 26 and 27 mesh with an output pinion 28 which imparts drive to the shaft of an electrical generator 29 on which it is fixedly mounted.

It will be appreciated that the two rotors 11 and 12 are acted upon simultaneously by components of the water flow from the inlet so as to cause rotation of the rotors 11 and 12 in opposite directions 15 and 16 about their axes 13 and 14 so that the rotors sweep out respective circular areas within the chamber 3 which overlap one another. The chamber 3 has a respective curved internal wall portion 30 or 31 which lies closely adjacent to the circular area swept out by the adjacent rotor, and additionally the circular area swept out by each rotor lies closely adjacent to the hub 19 of the other rotor. In other words the tips 32 of the rotor lobes 17 and 18 of each rotor pass close to the internal wall portion 30 or 31 and the hub 14 of the other rotor in order to minimise leakage of water past the tips 32 of the rotor. Furthermore the rotor lobes 17 and 18 have hollow axial spaces 33 to decrease the weight of the rotor.

Furthermore it will be appreciated that each of the inlet port 4 and the outlet port 6 is in the form of a slot having its major dimension parallel to the rotor axes 13 and 14, the inlet port 4 being narrower than the outlet port 6 in the embodiment of FIGS. 1 and 2. Also a flow splitter 34 is supported within the inlet port 4 by a series of supports 35 spaced along the length of the slot in order to split the inlet flow to assist the required action of the flow components impinging on the rotor lobes in such a manner as to rotate the two rotors in opposite directions. It might also be advantageous in terms of turbine efficiency to provide a series of flow splitters spaced axially along the inlet port 4 in order to divide up the inlet flow axially into a series of flows which will tend to have both radial and axial components relative to the rotors.

In the embodiment of FIGS. 1 and 2 the rotor lobes 17 and 18 have involute surfaces 36 with involute base circle diameters corresponding to two thirds of the distance between the rotor axes 13 and 14. The epitrochoid dedendums have been closely approximated by a radius of 15% lobe outside diameter. Use of these profiles substantially eliminates interlobe trapped volumes which would need to be vented.

The two-lobe rotors of FIGS. 1 and 2 are advantageous in that they are particularly straightforward to fabricate, and can be easily cast without draw angles on the important working surfaces. They could be made from metal, plastics or wood with a steel core or even from concrete. Furthermore highly accurate lobes are not necessary where low heads of water are used as these would imply low pressures so that reasonable clearances can be used. It may also be advantageous to provide one or more flow splitters of similar form to the flow splitter 34 in the outlet port 6.

FIG. 3 shows another form of water turbine 38 in accordance with the invention having two three-lobed rotors 40 and 41. In this figure like reference numerals are used to denote the same parts as in FIGS. 1 and 2. The use of three-lobed rotors offers greater flexibility of design than the simpler two-lobed rotor version as a wider outlet port can be used without prejudicing rotor to casing sealing. In this regard it should be noted that outlet flow velocity is a critical factor in determining the power conversion efficiency of the turbine, and that this permits greater latitude in output port design, possibly involving use of flow splitters and the like.

In the embodiment of FIG. 3 each lobe 42 of the rotors 40 and 41 has a cross-sectional shape which is symmetrical about a centre line 43 constituting a radius of the rotor and which has radially inner and outer parts having edges 44 and 45 constituted respectively by a hypocycloid and an epicycloid. In the illustrated embodiment the cycloid generating circle has a diameter equal to half the pitch circle diameter, and accordingly the hypocycloid becomes a straight radial line which helps manufacture considerably by virtue of the fact that the radially inner edges 44 of each lobe 42 are straight. This also gives a very definable line of demarkation for interlobe trapped volume venting.

FIG. 4 shows a further form of water turbine 48 in accordance with the invention having two four-lobed rotors 49 and 50. This gives still further latitude in outlet design. In the particular embodiment illustrated two outlet ports 51 and 52 are provided from the chamber 3 with a view to decreasing the outlet flow velocity and optimising the conversion efficiency of the turbine. In this four-lobe rotor arrangement, full conjugate meshing is provided between the rotors 49 and 50, and this may dispense with the need for phasing gearing.

FIG. 5 shows a further form of water turbine 53 in accordance with the invention having two four-lobed rotors 54 and 55 whose lobes are provided with reinforced rubber or fibreglass cladding members 56 to minimise wear of the rotors and to permit the lobe tips 32 to pass close to the internal wall of the casing 2 to minimise water leakage whilst enabling deformation of the tips 32 to accommodate any entrained debris in the water flow. The four cladding members 56 covering the four lobes of each rotor 54 or 55 are held by means of clamping strips 57 which are attached to the rotor by bolts (not shown) and which serve to clamp tire-type beaded longitudinal edges 56A of the two adjacent cladding members 56. The rotors 54 and 55 include axial bores 57A filled with a rigid foamed plastics material, and may also be provided with balance weights 57B if required.

Whilst it is theoretically possible to dispense with phasing gearing in the embodiment of FIG. 5, it is preferred to incorporate such phasing gearing in order to provide the required accurate phasing control. Preferably helical phasing gears are provided on the two rotor shafts, and the arrangement is such as to permit clearance between the rotor lobes to be adjusted to a practical minimum by relative axial movement between the phasing gears. Since the phasing gears provide full torque transference there is no need for each rotor lobe to be symmetrical about a centre line, and FIG. 6 shows a variant design in which each lobe of the two rotors 54' and 55' has a cutaway trailing edge 54A forming a straight line which is slightly inclined relative to the lobe centre line. FIG. 6 also shows in broken outline 55" the position of the rotor 55' relative to the rotor 54' when there is minimum lobe overlap (bearing in mind that the outline 55" is shown displaced relative to the true outline of the rotor 55' merely to enable the relative positions of the rotors in this operational state to be more easily appreciated). A relatively large space 47 is thereby provided between opposing lobe edges 54A of the two rotors for accommodating a trapped volume of water, and this volume does not decrease during rotation of the rotors so that problems, such as rotor knocking, associated with compression of a trapped volume of substantially non-compressible fluid are largely avoided. Another possible solution to the problem of trapped water volumes between the rotor lobes is to make the two rotors of different diameters, although this would complicate the design as the shape of the casing 2 would also have to be adapted to match the different sized rotors.

Such water turbine arrangements can be used to provide the motive power in a number of different arrangements. As well as supplying drive directly to a generator by way of a step-up gear or belt drive arrangement, the turbine may be used to drive a plurality of oil or hydraulic rams or an oil or hydraulic pump or motor unit. Alternatively the motive power may be supplied directly to operating machinery, such as mill machinery or a water pump. In the latter case the turbine could be used to achieve pressures which are not dependent on the supply head. The turbine arrangement would not require complex speed governing devices, and the ancillary equipment required would be minimal so that it would not be necessary to provide an associated large and unsightly turbine building. Furthermore a number of turbine units could be provided at low cost with the units being installed in tiers following a river's natural fall, thus avoiding the need for re-grading of the river and/or extensive civil engineering works.

Furthermore the water turbine arrangement in accordance with the invention may be adapted for use in a tidal estuary provided that the arrangement is such as to permit the direction of rotation of the rotors to be reversed on turning of the tide so that water flow then takes place from the outlet to the inlet rather than from the inlet to the outlet as previously. Of course, in this case, the turbine chamber will have ports which serve either as the inlet or as the outlet depending on the state of the tide. FIGS. 7 and 8 show two turbines 58 and 68 suitable for this purpose, similar reference numerals being used for the same parts as in FIGS. 1 and 2.

Referring to FIG. 7, the turbine 58 has two rotors which are not shown in the figure for simplicity but which have axes of rotation 13 and 14 and are generally of the form previously described. Furthermore the chamber 3 has ports 59 and 60, each of which is partially defined by pivotal flaps 61 or 62. When the water flow is in the direction indicated by the arrows in FIG. 7, the port 60 serves as the inlet and the head of water keeps the flaps 62 in the position shown in the figure in solid lines, whereas the port 59 serves as the outlet and the flaps 61 are pivoted by the flow to the positions shown in solid lines in the figure. This ensures that the inlet port is narrower than the outlet port and that the inlet flow velocity $v_1$ is greater than the outlet flow velocity $v_2$. When the direction of flow of water through the turbine changes on turning of the tide, the port 59 then acts as the inlet port and the port 60 acts as the outlet port and the flaps 61 and 62 are pivoted into the positions shown in broken lines in the figure.

The turbine 68 of FIG. 8 is generally similar to the turbine 58 of FIG. 7 except that pivotal flaps 71 and 72 of different form are provided. In this case each pivotal flap 71 or 72 has associated therewith a flow splitter part 73 mounted on a support 74. When one of the ports 59 and 60 serves as the inlet port, as shown in solid lines for the port 60 in FIG. 8, the flaps 72 take up their inner positions as shown in which the associated splitter parts 73 are held together to form a complete flow splitter 75. Conversely the flaps 71 of the port 59 serving as the outlet port are pivoted outwardly into the positions shown in solid lines in FIG. 8.

FIGS. 9 and 10 show a turbine arrangement for use in a tidal estuary in which the direction of rotation of the rotors is not reversed on turning of the tide. In this case the turbine 78 has two inlet ports 79 and 80 and two outlet ports 81 and 82, each of which is provided with a respective pivotal flap 83. When the tidal flow is upstream, water flows through the turbine 78 in the direction of the arrow 84, that is through the inlet port 79 and the outlet port 81, the inlet port 80 and the outlet port 82 being closed by the associated flaps 83 during such flow. On the other hand, when the tidal flow is downstream, water flows through the turbine 78 in the direction of the arrow 85, that is through the inlet port 80 and the outlet port 82, the inlet port 79 and the outlet port 81 being closed off by the associated flaps 83 in this case. In both cases water flows through the rotors 11 and 12 in the same direction, the inlet in each case being disposed higher than the outlet, as may be seen in FIG. 10, and a draught tube 86 being provided at the outlet side of the rotors if necessary.

A similar water turbine arrangement to that described above could be used to harness power from the water waves which are present in addition to the tidal flow at sea or in a tidal estuary. In this case a dam may be provided which extends transversely to the wave direction and which is fitted with tidal flaps at different levels. Each tidal flap is pivoted to open inwardly to admit water to the dam when the tidal level reaches the level of the flap. In view of the fact that there is an appreciable velocity head at each wave crest, the action of the wave beating against the tidal flaps will admit water to the dam so as to create a static head of water within the dam which is additional to head of water provided by the tidal level and which corresponds to the velocity head of the wave crests. This additional head is then available for power generation by driving of the turbine rotors. If the turbine arrangement is fitted with a suitable draught tube similar to that shown at 86 in FIG. 10, the head differential can be used to drive the rotors at any state of the tide.

In the event that the wave direction varies substantially with time, it may be advantageous to provide a series of discrete convex coffer dams, each of which has an outflow coupled by way of one-way input flaps to a central turbine casing so that the turbine may be driven by the combined outflow from the different dams.

We claim:

1. A water turbine comprising a turbine chamber (3), at least one inlet port and at least one outlet port (4, 6) opening into the chamber (3) for the passage of inlet and outlet water flows, and rotors (11, 12) arranged within the chamber (3) with their axes of rotation (13, 14) parallel so as to be rotatable by the inlet water flow, each of the rotors (11, 12) having two or more substantially equiangularly distributed lobes (17, 18) and the arrangement being such that adjacent rotors rotate in opposite directions with their lobes in mesh with one another, wherein each lobe of each rotor has a profile which is recessed at its trailing edge relative to a normal meshing lobe profile so as to define between the rotors a space (47) for taking up water trapped between the meshing lobes such that the volume of the space (47) does not decrease during rotation of the rotors, and wherein the overall throughflow cross-section of said at least one inlet port (4) is less than the overall throughflow cross-section of said at least one outlet port (6) so as to ensure that the velocity of inlet water flow is high in relation to the velocity of outlet water flow.

2. A water turbine according to claim 1, characterised in that said at least one inlet port (4) incorporates a flow splitter (34) for accelerating the inlet water flow in the form of jets which impinge on the rotors (11, 12).

3. A water turbine according to claim 1, characterised in that each lobe (42) of each rotor (40, 41) comprises a radially inner part having an edge (44) which extends along a radius of the rotor and a radially outer part (45) having a convexly curved edge.

4. A water turbine according to claim 1, characterised in that the chamber (3) has curved internal wall portions (30, 31) which lie closely adjacent to portions of the circular areas swept out by rotation of the rotors (11, 12) so that the tips (32) of the lobes (17, 18) of the rotor (11, 12) which is adjacent to each wall portion (30, 31) almost contact the wall portion (30, 31) in the course of rotation.

5. A water turbine according to claim 1, characterised in that each rotor (11, 12) has a length appreciably greater than its diameter, and each of the inlet and outlet ports (4, 6) is in the form of a slot having its major dimension parallel to the axes of the rotors (11, 12).

6. A water turbine according to claim 1, characterised in that the rotors (11, 12) are coupled together by phasing gears (26, 27).

7. A water turbine according to claim 1, characterised in that the direction of rotation of the rotors (11, 12) is reversible in dependence on the direction of water flow between the inlet and outlet ports (59, 60).

8. A water turbine according to claim 1, characterised in that a draught tube (86) is coupled to the outlet port.

* * * * *